US008062382B2

(12) United States Patent
Batchelor et al.

(10) Patent No.: US 8,062,382 B2
(45) Date of Patent: Nov. 22, 2011

(54) SHADING COMPOSITION

(75) Inventors: Stephen Norman Batchelor, Wirral (GB); Jayne Michelle Bird, Wirral (GB); Susan Barbara Joyce, Wirral (GB)

(73) Assignee: Conopco Inc., Englewood Cliffs, NJ (US)

( * ) Notice: Subject to any disclaimer, the term of this patent is extended or adjusted under 35 U.S.C. 154(b) by 0 days.

(21) Appl. No.: 12/993,096

(22) PCT Filed: Feb. 16, 2009

(86) PCT No.: PCT/EP2009/051788
§ 371 (c)(1),
(2), (4) Date: Nov. 17, 2010

(87) PCT Pub. No.: WO2009/141173
PCT Pub. Date: Nov. 26, 2009

(65) Prior Publication Data

US 2011/0072595 A1 Mar. 31, 2011

(30) Foreign Application Priority Data

May 20, 2008 (EP) .................................... 08156569

(51) Int. Cl.

| | |
|---|---|
| ***C09B 17/00*** | (2006.01) |
| ***C11D 3/42*** | (2006.01) |
| ***C11D 3/395*** | (2006.01) |

(52) U.S. Cl. .......... 8/137; 8/648; 8/655; 8/657; 510/276

(58) Field of Classification Search .............. 8/137, 648, 8/655, 657; 510/276
See application file for complete search history.

(56) References Cited

U.S. PATENT DOCUMENTS

| | | | | |
|---|---|---|---|---|
| 6,616,708 | B2 * | 9/2003 | Ohashi et al. | 8/405 |
| 2004/0256598 | A1 * | 12/2004 | Plos et al. | 252/299.01 |

FOREIGN PATENT DOCUMENTS

| | | |
|---|---|---|
| DE | 197 46 137 | 4/1999 |
| EP | 1 645 296 | 4/2006 |
| WO | 2007/039042 | 4/2007 |
| WO | 2008017570 | 2/2008 |

OTHER PUBLICATIONS

PCT International Search Report in PCT application PCT/EP2009/051788.
PCT International Search Report in PCT application PCT/EP2009/051785.
Abstract of DE 19 766 137—published Apr. 22, 1999.
Abstract of EP 1 645 296—published Apr 12, 2006.
Co-pending Application: Applicant: Batchelor et al., U.S. Appl. No. 12/993,097.

* cited by examiner

*Primary Examiner* — Amina Khan
(74) *Attorney, Agent, or Firm* — Rimma Mitelman

(57) ABSTRACT

The present invention provides a laundry treatment composition comprising a cationic azine dye.

10 Claims, No Drawings

SHADING COMPOSITION

FIELD OF INVENTION

The present invention relates to the delivery of dyes to fabrics.

BACKGROUND OF THE INVENTION

Many white garments are created from either pure cotton or polyester cotton blends. Polyester cotton blends typically contain greater than 60% polyester. To enhance whiteness shading dyes may be included in domestic wash products that deposit onto fabrics to counter-act yellowing and greying of the fabric. WO 2008/017570 (Unilever) discloses the use of acid azine dyes as shading agents for domestic wash product. Acid azine dyes carry negatively charges substituents making the net charge of the dye anionic. Acid azine dyes deposit onto cotton but do not build up over multiple washes, preventing overblueing. Acid azine dyes deposit poorly to polyester-cotton blended garments and provide no deposition to polyester garments. The poor deposition on polycotton is thought to be due to the low cotton content of these garments. A shading system is required which give good deposition to polycotton, without unacceptably large deposition to cotton garment in the same wash.

U.S. Pat. No. 6,616,708, to Kao, discloses the use of cationic azine dyes in hair dye compositions.

WO 2007/039042 discloses Basic Violet 5 and Basic Violet 6 for use in laundry detergent compositions.

SUMMARY OF THE INVENTION

Selected cationic azine dyes have a high substantivity to polycotton whilst depositing well on cotton and are relatively alkaline stable and weight efficient.

The cationic azine dyes described herein have the further advantage of being substantive to pure polyester garments.

The cationic azine dyes described herein also have the advantage of providing good whiteness improvement to the fabric with little dulling of the fabric.

The cationic azine dyes described herein have the further advantage of showing no-build up behaviour on a range of fabrics.

In one aspect the present invention provides a laundry treatment composition comprising:

(i) from 2 to 70 wt % of a surfactant;

(ii) from 0.005 to 2 wt % of a fluorescer; and, (iii) from 0.0001 to 0.1 wt % of a blue or violet cationic azine dye, the azine dye selected from the following structure:

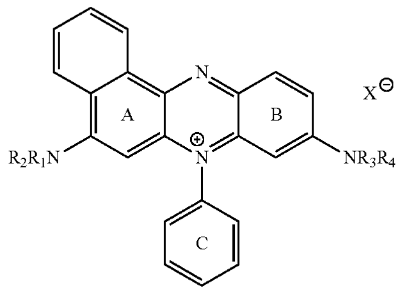

wherein X— is a negative anion;

no more than three of the groups $R_1$, $R_2$, $R_3$ and $R_4$ are H and are independently selected from: a polyether chain, benzyl, phenyl, amine substituted benzyl, amine substituted phenyl, $COCH_3$, H, a linear or branched alkyl chains; a linear or branched alkyl chains which is substituted by one or more groups selected from: ester groups; Cl; F; CN; OH; $CH_3O$—; $C_2H_5O$—; and, phenyl; and, the dye is not covalently bound to a negatively charged substituent.

In another aspect the present invention provides a domestic method of treating a textile, the method comprising the steps of:

(i) treating a textile with an aqueous solution of the cationic azine dye, the aqueous solution comprising from 1 ppb to 1 ppm of the azine dye; and, from 0.0 g/L to 3 g/L of a surfactant; and, (ii) rinsing and drying the textile.

It is preferred that the aqueous solution used in the method has a fluorescer present.

The method is particularly applicable to wash loads containing polyester cotton blend garments/textiles.

The formulation may be liquid or granular. The preferred format is that of a granular laundry treatment composition.

DETAILED DESCRIPTION OF THE INVENTION

Preferably the cationic azine dye gives a blue or violet colour to the cloth with a hue angle of 250-345, more preferably 265 to 330, most preferably 270 to 300. The cloth used is white bleached non-mercerised woven cotton sheeting.

Preferably, no more than two of the groups $R_1$, $R_2$, $R_3$ and $R_4$ are H.

Preferably, no more than one of the groups $R_1$, $R_2$, $R_3$ and $R_4$ is H.

It is preferred that $R_1$, $R_2$, $R_3$ and $R_4$ are independently selected from: H, $CH_3$, $C_2H_5$, phenyl, and a benzyl group carrying an amine selected from: —$NH_2$; —$N(CH_3)_2$; and, —$N(C_2H_5)_2$.

It is preferred that phenyl is one or two of the groups $R_1$, $R_2$, $R_3$ and $R_4$ and more preferably the phenyl carries an amine, preferably one, amine that is preferably selected from: —$NH_2$; —$N(CH_3)_2$; and, —$N(C_2H_5)_2$.

The $R_1$, $R_2$, $R_3$ and $R_4$ groups may be a polyether chain. A polyether chain is defined as at least two repeating units that are chemically bound via the ether's oxygen. Preferred polyether chains are selected from ethylene oxides or propylene oxides. Where an alkyl and/or polyether chain is present the chain preferably has a molecular weight of less than 1000, more preferably less than 400, even more preferably less than 200.

The cationic azine dye may be further substituted by uncharged organic groups. If the cationic azine dye is further substituted it is preferred that the uncharged organic groups should have a total molecular weight of less than 400, preferably less than 150. Preferred uncharged organic groups may be selected from $NHCOCH_3$, $CH_3$, $C_2H_5$, $CH_3O$, $C_2H_5O$, amine, Cl, F, Br, I, $NO_2$, $CH_3SO_2$, and CN.

$X^-$ is not essential aspect of the invention and may be varied widely. $X^-$ may be an anion such as $RCOO^-$, $BPh_4^-$, $ClO_4^-$, $BF_4^-$, $PF_6^-$, $RSO_3^-$, $RSO_4^-$, $SO_4^{2-}$, $NO_3^-$, $F^-$, $Cl^-$, $Br^-$, or $I^-$, with R being hydrogen, optionally substituted alkyl or optionally substituted aryl. Preferably $X^-$ is selected from: $CH_3SO_3^-$, $CH_3CO_2^-$, $BF_4^-$, $Cl^-$, $F^-$, $Br^-$, and $I^-$.

Preferred examples of azine dyes (colour index names) are basic blue 14 and basic blue 13.

The aromatic ring C may be substituted by one or more methyl groups.

Preferably the laundry treatment composition is in a container (pack) that has a moisture vapour transfer rate such that when stored at 37° C. at 70% relative humidity the closed pack containing the laundry treatment composition does not increase in weight by more than 1 wt % for the first day (24 hours) stored at 37° C. at 70% relative humidity.

In granular formulation the cationic azine dye is preferably granulated with an acidic component to reduce hydrolysis on storage as discussed in WO2007/039042 (Unilever).

For addition to granular formulation the dye may be added to the slurry to be spray dried or added via post-dosed granules.

In a preferred embodiment the dye powder obtained from the dye synthesis is mixed with a $Na_2SO_4$ or NaCl or pre-prepared granular base or full detergent formulation to give a 0.1 to 5 dye wt % mixture. This dry mix is then mixed into the granular formulation. The dye powder is preferably formed by drying a liquid slurry or solution of the dye, for example by vacuum drying, freeze drying, drying in drum dryers, Spin Flash® (Anhydro), but most preferably by spray drying. The dye powder may be ground before, during or after the making of the slurry. This grinding is preferably accomplished in mills, such as for example ball, swing, bead or sand mills, or in kneaders.

Other ingredients such as dispersants or alkali metal salts may be added to the liquid slurry. The dye powder preferably contains 20 to 100 wt % of the dye.

Preferably, the dye powder has an average particle size, APS, from 0.1 to 300 microns, preferably 10 to 100 microns. Preferably this is as measured by a laser diffraction particle size analyser, preferably a Malvern HP with 100 mm lens.

The above incorporation of the dye is equally applicable to other dyes, in particular Acid Violet 50, Acid Blue 59, and Acid Blue 98.

The following are examples of cationic azine dyes:

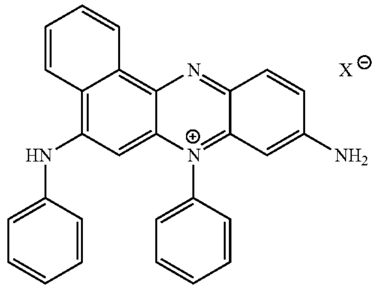

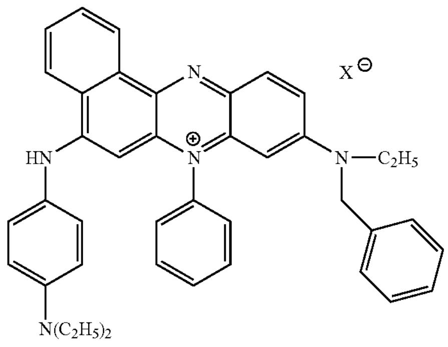

-continued

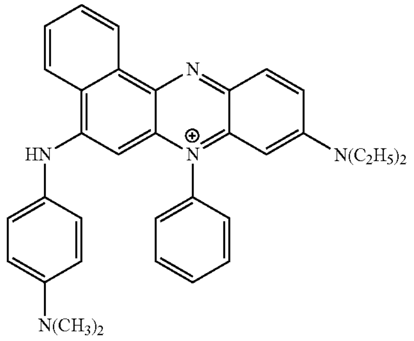

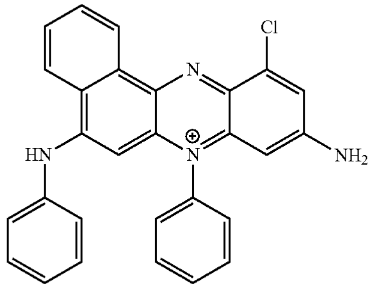

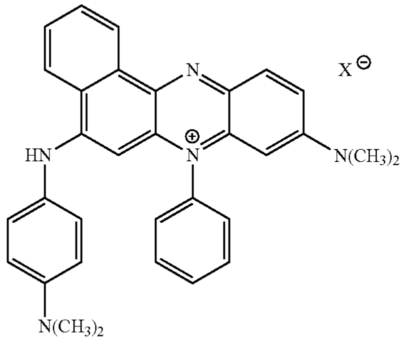

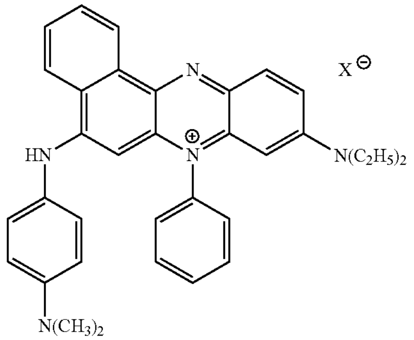

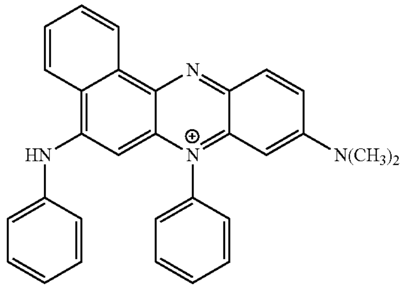

-continued

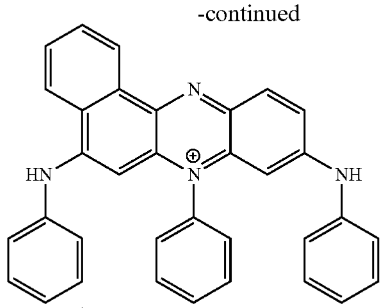

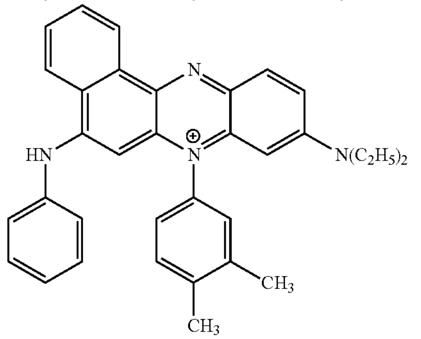

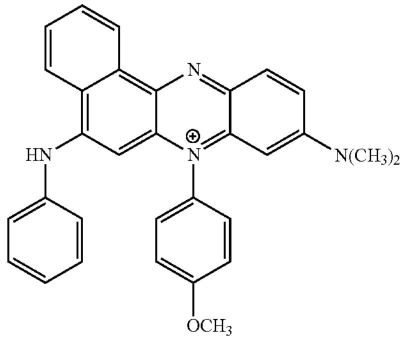

Other Dyes

In a preferred embodiment of the invention, other shading colourants may be present that build up over multiple washes, thereby counteracting long term yellowing and greying effect. They are preferably selected from blue and violet pigment such as pigment violet 23, solvent and disperse dyes such as solvent violet 13, disperse violet 28, bis-azo direct dyes such as direct violet 9, 35, 51 and 99, and triphenodioxazine direct dyes such as direct violet 54.

Even more preferred is the presence of acid azine dyes as described in WO 2008/017570; the level of the acid azine dyes should be in the range from 0.0001 to 0.1 wt %. The acid azine dyes provide benefit predominately to the pure cotton garments and the cationic azine dyes to the polycotton garments. Preferred acid azine dyes are acid violet 50, acid blue 59 and acid blue 98. Preferably they are added to the formulation together with the cationic azine dye.

Photobleaches such as sulphonated Zn/Al phthalocyanins may be present.

Surfactant

The composition comprises between 2 to 70 wt % of a surfactant, most preferably 10 to 30 wt %. In general, the nonionic and anionic surfactants of the surfactant system may be chosen from the surfactants described “Surface Active Agents” Vol. 1, by Schwartz & Perry, Interscience 1949, Vol. 2 by Schwartz, Perry & Berch, Interscience 1958, in the current edition of “McCutcheon's Emulsifiers and Detergents” published by Manufacturing Confectioners Company or in “Tenside-Taschenbuch”, H. Stache, 2nd Edn., Carl Hauser Verlag, 1981. Preferably the surfactants used are saturated.

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Specific nonionic detergent compounds are $C_6$ to $C_{22}$ alkyl phenol-ethylene oxide condensates, generally 5 to 25 EO, i.e. 5 to 25 units of ethylene oxide per molecule, and the condensation products of aliphatic $C_8$ to $C_{18}$ primary or secondary linear or branched alcohols with ethylene oxide, generally 5 to 40 EO.

Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$ to $C_{18}$ alcohols, produced for example from tallow or coconut oil, sodium and potassium alkyl $C_9$ to $C_{20}$ benzene sulphonates, particularly sodium linear secondary alkyl $C_{10}$ to $C_{15}$ benzene sulphonates; and sodium alkyl glyceryl ether sulphates, especially those ethers of the higher alcohols derived from tallow or coconut oil and synthetic alcohols derived from petroleum. The preferred anionic detergent compounds are sodium $C_{11}$ to $C_{15}$ alkyl benzene sulphonates and sodium $C_{12}$ to $C_{18}$ alkyl sulphates. Also applicable are surfactants such as those described in EP-A-328 177 (Unilever), which show resistance to salting-out, the alkyl polyglycoside surfactants described in EP-A-070 074, and alkyl monoglycosides.

Preferred surfactant systems are mixtures of anionic with nonionic detergent active materials, in particular the groups and examples of anionic and nonionic surfactants pointed out in EP-A-346 995 (Unilever). Especially preferred is surfactant system that is a mixture of an alkali metal salt of a $C_{16}$ to $C_{18}$ primary alcohol sulphate together with a $C_{12}$ to $C_{15}$ primary alcohol 3 to 7 EO ethoxylate.

The nonionic detergent is preferably present in amounts greater than 10%, e.g. 25 to 90 wt % of the surfactant system. Anionic surfactants can be present for example in amounts in the range from about 5% to about 40 wt % of the surfactant system.

In another aspect which is also preferred the surfactant may be a cationic such that the formulation is a fabric conditioner.

Cationic Compound

When the present invention is used as a fabric conditioner it needs to contain a cationic compound.

Most preferred are quaternary ammonium compounds.

It is advantageous if the quaternary ammonium compound is a quaternary ammonium compound having at least one $C_{12}$ to $C_{22}$ alkyl chain.

It is preferred if the quaternary ammonium compound has the following formula:

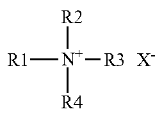

in which $R^1$ is a $C_{12}$ to $C_{22}$ alkyl or alkenyl chain; $R^2$, $R^3$ and $R^4$ are independently selected from $C_1$ to $C_4$ alkyl chains and $X^-$ is a compatible anion. A preferred compound of this type is the quaternary ammonium compound cetyl trimethyl quaternary ammonium bromide.

A second class of materials for use with the present invention are the quaternary ammonium of the above structure in which $R^1$ and $R^2$ are independently selected from $C_{12}$ to $C_{22}$ alkyl or alkenyl chain; $R^3$ and $R^4$ are independently selected from $C_1$ to $C_4$ alkyl chains and $X^-$ is a compatible anion.

A detergent composition according to claim 1 in which the ratio of (ii) cationic material to (iv) anionic surfactant is at least 2:1.

Other suitable quaternary ammonium compounds are disclosed in EP 0 239 910 (Proctor and Gamble).

It is preferred if the ratio of cationic to nonionic surfactant is from 1:100 to 50:50, more preferably 1:50 to 20:50.

The cationic compound may be present from 1.5 wt % to 50 wt % of the total weight of the composition. Preferably the cationic compound may be present from 2 wt % to 25 wt %, a more preferred composition range is from 5 wt % to 20 wt %.

The softening material is preferably present in an amount of from 2 to 60% by weight of the total composition, more preferably from 2 to 40%, most preferably from 3 to 30% by weight.

The composition optionally comprises a silicone.

Builders or Complexing Agents:

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate and organic sequestrants, such as ethylene diamine tetra-acetic acid.

Examples of precipitating builder materials include sodium orthophosphate and sodium carbonate.

Examples of calcium ion-exchange builder materials include the various types of water-insoluble crystalline or amorphous aluminosilicates, of which zeolites are the best known representatives, e.g. zeolite A, zeolite B (also known as zeolite P), zeolite C, zeolite X, zeolite Y and also the zeolite P-type as described in EP-A-0,384,070.

The composition may also contain 0-65% of a builder or complexing agent such as ethylenediaminetetraacetic acid, diethylenetriamine-pentaacetic acid, alkyl- or alkenylsuccinic acid, nitrilotriacetic acid or the other builders mentioned below. Many builders are also bleach-stabilising agents by virtue of their ability to complex metal ions.

Zeolite and carbonate (carbonate (including bicarbonate and sesquicarbonate) are preferred builders.

The composition may contain as builder a crystalline aluminosilicate, preferably an alkali metal aluminosilicate, more preferably a sodium aluminosilicate. This is typically present at a level of less than 15% w. Aluminosilicates are materials having the general formula:

$$0.8\text{-}1.5\ M_2O.Al_2O_3.\ 0.8\text{-}6\ SiO_2$$

where M is a monovalent cation, preferably sodium. These materials contain some bound water and are required to have a calcium ion exchange capacity of at least 50 mg CaO/g. The preferred sodium aluminosilicates contain 1.5-3.5 $SiO_2$ units in the formula above. They can be prepared readily by reaction between sodium silicate and sodium aluminate, as amply described in the literature. The ratio of surfactants to alumuminosilicate (where present) is preferably greater than 5:2, more preferably greater than 3:1.

Alternatively, or additionally to the aluminosilicate builders, phosphate builders may be used. In this art the term 'phosphate' embraces diphosphate, triphosphate, and phosphonate species. Other forms of builder include silicates, such as soluble silicates, metasilicates, layered silicates (e.g. SKS-6 from Hoechst).

Preferably the laundry detergent formulation is a non-phosphate built laundry detergent formulation, i.e., contains less than 1 wt % of phosphate.

Fluorescent Agent

The composition preferably comprises a fluorescent agent (optical brightener). Fluorescent agents are well known and many such fluorescent agents are available commercially. Usually, these fluorescent agents are supplied and used in the form of their alkali metal salts, for example, the sodium salts. The total amount of the fluorescent agent or agents used in the composition is generally from 0.005 to 2 wt %, more preferably 0.01 to 0.1 wt %. Preferred classes of fluorescer are: Di-styryl biphenyl compounds, e.g. Tinopal (Trade Mark) CBS-X, Di-amine stilbene di-sulphonic acid compounds, e.g. Tinopal DMS pure Xtra and Blankophor (Trade Mark) HRH, and Pyrazoline compounds, e.g. Blankophor SN. Preferred fluorescers are: sodium 2 (4-styryl-3-sulfophenyl)-2H-napthol[1,2-d]triazole, disodium 4,4'-bis{[(4-anilino-6-(N methyl-N-2 hydroxyethyl) amino 1,3,5-triazin-2-yl)]amino}stilbene-2-2'disulfonate, disodium 4,4'-bis{[(4-anilino-6-morpholino-1,3,5-triazin-2-yl)]amino}stilbene-2-2' disulfonate, and disodium 4,4'-bis(2-sulfostyryl)biphenyl.

It is preferred that the aqueous solution used in the method has a fluorescer present. When a fluorescer is present in the aqueous solution used in the method it is preferably in the range from 0.0001 g/l to 0.1 g/l, preferably 0.001 to 0.02 g/l.

Perfume

Preferably the composition comprises a perfume. The perfume is preferably in the range from 0.001 to 3 wt %, most preferably 0.1 to 1 wt %. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co.

It is commonplace for a plurality of perfume components to be present in a formulation. In the compositions of the present invention it is envisaged that there will be four or more, preferably five or more, more preferably six or more or even seven or more different perfume components.

In perfume mixtures preferably 15 to 25 wt % are top notes. Top notes are defined by Poucher (Journal of the Society of Cosmetic Chemists 6(2):80 [1955]). Preferred top-notes are selected from citrus oils, linalool, linalyl acetate, lavender, dihydromyrcenol, rose oxide and cis-3-hexanol.

Perfume and top note may be used to cue the whiteness benefit of the invention.

It is preferred that the laundry treatment composition does not contain a peroxygen bleach, e.g., sodium percarbonate, sodium perborate, and peracid.

Polymers

The composition may comprise one or more polymers. Examples are carboxymethylcellulose, poly (ethylene glycol), poly(vinyl alcohol), polycarboxylates such as polyacrylates, maleic/acrylic acid copolymers and lauryl methacrylate/acrylic acid copolymers.

Polymers present to prevent dye deposition, for example poly(vinylpyrrolidone), poly(vinylpyridine-N-oxide), and poly(vinylimidazole), are preferably absent from the formulation.

Enzymes

The laundry treatment composition may contain an enzyme.

EXAMPLES

| Dye structures | |
|---|---|
| | structure |
| Dye 1 comparative An anionic azine dye | 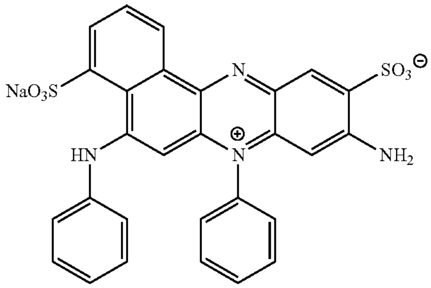 |
| Dye 2 comparative A cationic azine dye | 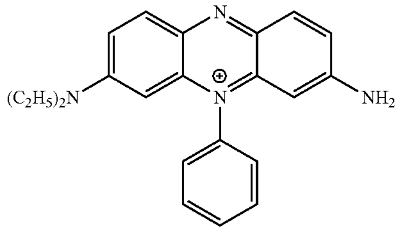 |
| Dye 6 | 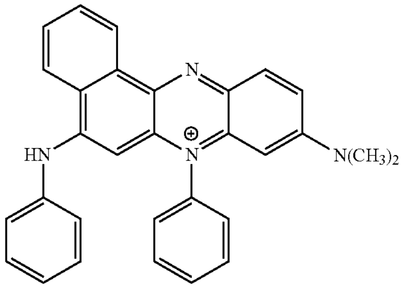 |

Example 1

Comparison of Dulling Properties

Woven Cotton and polycotton fabrics were washed in an aqueous wash solution (demineralised water) containing 1 g/L Linear Alkyl benzene sulfonate, 1 g/L sodium carbonate and 1 g/L sodium chloride at a liquor to cloth ratio of 30:1. To the wash solution shading were added such that the optical density (5 cm) at the maximum optical absorption in the range 400-750 nm was 0.5 and 0.1. After 30 minutes of agitation the clothes were removed rinsed and dried. After the wash the reflectance spectra measured on a reflectometer and the colour expressed as CIE L*a*b* values, and the whiteness expressed as the Ganz value.

The dulling of the cloth was expressed as the total colour deposited on the cloth given by the ΔE value:

$$\Delta E=[(L_c-L_d)^2+(a_c-a_d)^2+(b_c-b_d)^2]^{0.5}$$

Where $L_c$, $a_c$, and $b_c$ are the CIE L a b values of the control cloths washed without dye And $L_d$, $a_d$, and $b_d$ are the CIE L a b values of the cloths washed with dye.

The increased in whiteness of the cloth was expressed as ΔGanz=Ganz(dye)−Ganz(control).

For each dye the effect of whitening, verses dulling the cloth was measured using the ratio ΔGanz/ΔE; a higher value represents greater whiteness with less dulling.

The results are given in the table below.

ΔGANZ/ΔE

| | ΔGanz/ΔE | | | |
|---|---|---|---|---|
| | Cotton | | Polycotton | |
| | OD = 0.1 | OD = 0.5 | OD = 0.1 | OD = 0.5 |
| Dye 1* | 7.0 | 6.9 | 6.5 | 6.6 |
| Dye 2* | 3.4 | 3.4 | 4.1 | 3.2 |
| Dye 6 | 6.0 | 6.0 | 6.5 | 6.8 |

*comparative

Dyes 1 and 6 are much less dulling than dye 2.

Example 2

Comparison of Whitening Properties on Fabrics

Comparison of the ΔGanz values from experiment 1 showed that dye 6 gives a good whiteness increase to polycotton and cotton, unlike dye 1. This occurs because of great dye deposition to polycotton for dye 6.

| | ΔGanz (cottons) | ΔGanz (polycottons) |
|---|---|---|
| Dye 1* | 22 | 5 |
| Dye 6 | 25 | 17 |

*comparative

Exemplary Base Powder Formulations A, B, C and D

| | Formulation | | | |
|---|---|---|---|---|
| | A | B | C | D |
| NaLAS | 15 | 20 | 10 | 14 |
| NI(7EO) | — | — | — | 10 |
| Na tripolyphosphate | — | 15 | — | — |
| Soap | — | — | — | 2 |
| Zeolite A24 | 7 | — | — | 17 |
| Sodium silicate | 5 | 4 | 5 | 1 |
| Sodium carbonate | 25 | 20 | 30 | 20 |
| Sodium sulphate | 40 | 33 | 40 | 22 |
| Carboxymethylcellulose | 0.2 | 0.3 | — | 0.5 |
| Sodium chloride | — | — | — | 5 |
| Lipase | 0.005 | 0.01 | — | 0.005 |
| Protease | 0.005 | 0.01 | — | 0.005 |
| Amylase | 0.001 | 0.003 | — | — |
| Cellulase | — | 0.003 | — | — |
| Acid Violet 50 | 0.0015 | 0.002 | — | — |
| Direct violet 9 | 0.0001 | — | — | — |
| Direct violet 54 | — | 0.0002 | — | 0.0001 |
| cationic azine dye | 0.0015 | 0.002 | 0.002 | 0.003 |
| Fluorescer | 0.1 | 0.15 | 0.05 | 0.3 |
| Water/impurities/minors | remainder | remainder | remainder | remainder |

The powder formulations A, B, C and D were made up with basic blue 13 and dye 6 from the examples respectively as the cationic azine dye.

Exemplary Base Liquid Formulations A, B, C and D

| | Formulation | | | |
|---|---|---|---|---|
| | A | B | C | D |
| NaLAS | 14 | 10 | 15 | 21 |
| NI(7EO) | 10 | 5 | 21 | 15 |
| SLES(3EO) | 7 | 10 | 7 | — |
| Soap | 2 | 4 | 1 | 0 |
| Citric acid | 1 | 1 | — | 1 |
| Glycerol | 0 | 1 | 5 | 0 |
| Propylene glycol | 5 | 3 | 0 | 4 |
| Sodium chloride | 1 | — | — | — |
| Amine ethoxylated polymers | 0.5 | 1 | — | — |
| Triethanol amine | 0 | 0.5 | 3 | 1 |
| Perfume | 0.2 | 0.1 | 0.3 | 0.4 |
| Protease | 0.005 | 0.01 | — | 0.005 |
| Amylase | 0.001 | 0.003 | — | — |
| Lipase | — | 0.003 | — | — |
| Fluorescer | 0.1 | 0.15 | 0.05 | 0.3 |
| cationic azine dye | 0.002 | 0.003 | 0.0008 | 0.004 |
| Solvent Violet 13 | — | 0.0002 | 0 | 0.001 |
| Water/impurities/minors | remainder | remainder | remainder | remainder |

The liquid formulations A, B, C and D were made up with basic blue 13 and dye 6 from the examples respectively as the cationic azine dye.

For both powder and liquids formulations, enzyme levels are given as percent pure enzyme. NI(7EO) refers to R—$(OCH_2CH_2)_nOH$, where R is an alkyl chain of C12 to C15, and n is 7. NaLAS is linear alkyl benzene sulphonate (LAS) and (SLES(3EO)) is $C_{12}$-$C_{18}$ alkyl polyethoxylate (3.0) sulphate.

A rinse conditioner formulation, for use in the rinse stage of the wash was also created. It contained 13.7 wt % N,N-di (tallowoyloxyethyl)-N,N-dimethylammonium chloride, 1.5 wt % perfume 0.004 wt % basic blue 13 and dye 6 from the examples respectively as the cationic azine dye, remainder minors and water.

We claim:

1. A laundry treatment composition comprising:

(i) from 2 to 70 wt % of a surfactant;

(ii) from 0.005 to 2 wt % of a fluorescer wherein the fluorescer is selected from the group consisting of: sodium 2 (4-styryl-3-sulfophenyl)-2H-napthol[1,2-d] triazole, disodium 4,4'-bis{[(4-anilino-6-(N methyl-N-2 hydroxyethyl)amino 1,3,5-triazin-2-yl)] amino}stilbene-2-2' disulfonate, disodium 4,4'-bis{[(4-anilino-6-morpholino-1,3,5-triazin-2-yl)]amino} stilbene-2-2' disulfonate, and disodium 4,4'-bis(2-sulfostyryl)biphenyl; and, (iii) from 0.0001 to 0.1 wt % of a blue or violet cationic azine dye, the azine dye selected from the following structure:

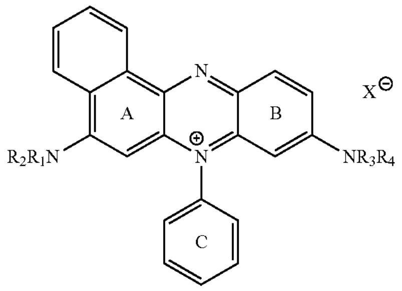

wherein X— is a negative anion;

no more than three of the groups $R_1$, $R_2$, $R_3$ and $R_4$ are H and are independently selected from: a polyether chain, benzyl, phenyl, amine substituted benzyl, amine substituted phenyl, $COCH_3$, H, a linear or branched alkyl chains; a linear or branched alkyl chains which is substituted by one or more groups selected from: ester groups; Cl; F; CN; OH; $CH_3O$—; $C_2H_5O$—; and, phenyl; and, the dye is not covalently bound to a negatively charged substituent.

2. A laundry treatment composition according to claim 1, wherein no more than two of the groups $R_1$, $R_2$, $R_3$ and $R_4$ are H.

3. A laundry treatment composition according to claim 2, wherein no more than one of the groups $R_1$, $R_2$, $R_3$ and $R_4$ is H.

4. A laundry treatment composition according to claim 1, wherein $R_1$, $R_2$, $R_3$ and $R_4$ are independently selected from: H, $CH_3$, $C_2H_5$, phenyl, and a benzyl group carrying an amine selected from: —$NH_2$; —$N(CH_3)_2$; and, —$N(C_2H_5)_2$.

5. A laundry treatment composition according to claim 1, wherein aromatic ring C is substituted by one or more methyl groups.

6. A laundry treatment composition according to claim 1, wherein the azine dye is further substituted by uncharged organic groups having a total molecular weight of less than 400.

7. A laundry treatment composition according to claim 6, wherein the uncharged organic groups are selected from: $NHCOCH_3$, $CH_3$, $C_2H_5$, $CH_3O$, $C_2H_5O$, amine, Cl, F, Br, I, $NO_2$, $CH_3SO_2$, and CN.

8. A laundry treatment composition according to claim 1, wherein the dye is selected from: basic blue 14 and basic blue 13.

9. A domestic method of treating a textile, the method comprising the steps of:

(i) treating a textile with an aqueous solution of a blue or violet cationic azine dye, the azine dye selected from the following structure:

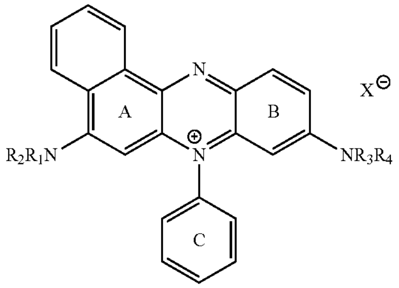

wherein X— is a negative anion:

no more than three of the groups $R_1$, $R_2$, $R_3$ and $R_4$ are H and are independently selected from: a polyether chain, benzyl, phenyl, amine substituted benzyl, amine substituted phenyl, $COCH_3$, H, a linear or branched alkyl chains: a linear or branched alkyl chains which is substituted by one or more groups selected from: ester groups: Cl: F: CN: OH: $CH_3O$—; $C_2H_5O$—; and, phenyl; and, the dye is not covalently bound to a negatively charged substituent, the aqueous solution comprising from 1 ppb to 1 ppm of the azine dye; and, from 0.0 g/L to 3 g/L of a surfactant; and, (ii) rinsing and drying the textile.

10. A domestic method of treating a textile according to claim 9, wherein the aqueous solution comprises a fluorescer in the range from 0.0001 g/l to 0.1 g/l.

* * * * *